(12) United States Patent
Kaminosono

(10) Patent No.: US 8,179,481 B2
(45) Date of Patent: *May 15, 2012

(54) THIN TYPE DISPLAY DEVICE

(75) Inventor: Takeshi Kaminosono, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1147 days.

This patent is subject to a terminal disclaimer.

(21) Appl. No.: 12/010,547

(22) Filed: Jan. 25, 2008

(65) Prior Publication Data

US 2008/0180582 A1    Jul. 31, 2008

(30) Foreign Application Priority Data

Jan. 26, 2007 (JP) ................. 2007-015832

(51) Int. Cl.
*H04N 5/64* (2006.01)

(52) U.S. Cl. ........................ 348/836; 348/837

(58) Field of Classification Search ............. 248/371; 348/836, 837, 838
See application file for complete search history.

(56) References Cited

U.S. PATENT DOCUMENTS 6,334,599 B1 * 1/2002 Jeong .................. 248/371

FOREIGN PATENT DOCUMENTS

| JP | 63-124775 U | 8/1988 |
| JP | 03-42186 U | 4/1991 |
| JP | 04-061575 | 2/1992 |
| JP | 2004-304679 | 10/2004 |

* cited by examiner

*Primary Examiner* — Basil Katcheves
(74) *Attorney, Agent, or Firm* — Morgan, Lewis & Bockius LLP

(57) ABSTRACT

In a thin type display device when driving is started by a swivel mechanism, voltage which is supplied from a power voltage supply circuit 14 to a motor driving IC 12 is switched and raised in stepwise. By this switching, operating voltage of a motor 13 by the motor driving IC 12 is switched and raised in stepwise, as a result vibration of a display portion can be suppressed.

6 Claims, 3 Drawing Sheets

THIN TYPE DISPLAY DEVICE

CROSS-REFERENCE TO RELATED APPLICATIONS

This application is based on Japanese Patent Application No. 2007-015832 filed on Jan. 26, 2007, and the contents of which are hereby incorporated by reference.

BACKGROUND OF THE INVENTION

1. Field of the Invention

The present invention relates to a thin type display device thin type display device which is made its display portion a thin type by various methods such as a liquid crystal method, a plasma method, a rear projection method or the like, in particular, the present invention relates to a thin type display device which is provided with a rotation driving mechanism (swivel mechanism) to make the display portion rotate in horizontal direction.

2. Description of the Related Art

Conventionally, there is a display device which is provided with a rotation driving mechanism (swivel mechanism) to rotate a display portion by transmitting rotating force of a motor in order to rotate the display portion on which an image is displayed to reproduce in horizontal direction. As for such rotation driving mechanism, not only mechanism that is formed for a display device in which the display portion is composed of a Braun tube (See, JP-UM-A-S63-124775, JP-UM-A-H03-042186, JP-A-H04-061575), but recently mechanism that is formed for a thin type display device in which the display portion is made a thin type by various methods such as a liquid crystal method, a plasma method, a rear projection method, or the like (See, JP-A-2004-304679), is also proposed.

According to the rotation driving mechanism that is disclosed in JP-UM-A-H03-042186, it has a structure in that an electromagnetic clutch is controlled in response to magnitude of loaded electric current when a driving motor is operated in order that stopping of rotating operation or appropriate control can be performed if the display portion collides with an obstruction when it is rotating. That is, because the loaded electric current of the driving motor becomes large when the display portion collides with the obstruction, the mechanism detects the collision with the obstruction based on the loaded electric current, and rotation of the display portion is stopped by cut off of the electromagnetic clutch.

Further, according to the rotation driving mechanism that is disclosed in JP-A-H04-061575, it has a structure in that the rotation driving mechanism is provided with a stepping motor which can easily obtain low speed rotation and high torque instead that it is provided with a small direct current motor which has small torque and a power transmission path with high gear ratio in order to secure high torque that is required to rotate the display portion of the display device which becomes larger and larger. As above described, because the gear ratio of the power transmission path can be lowered and its configuration can be made simple by providing with the stepping motor, the configuration of the rotation driving mechanism also can be made simple. Still further, according to the rotation driving mechanism that is disclosed in JP-A-2004-304679, the stepping motor is utilized and the rotation driving mechanism is structured as a swivel and tilting mechanism which can rotate the display portion of the thin type display device in horizontal direction and in tilt direction respectively.

When the above described rotation driving mechanism is arranged in the thin type display device, if the thin type display device is set up on floor provided with the rotation driving mechanism, and the swivel mechanism portion which makes the display portion rotate in the horizontal direction is driven, vibration is caused in whole device by starting or stopping of the rotating operation because center of gravity of the display portion is high. Especially when the display portion is stopped immediately after the display portion is started to rotate by the swivel mechanism in the horizontal direction, the vibration that is caused in the display portion becomes large. A rotation driving mechanism disclosed in JP-A-H04-061575 employs a structure in that the vibration that is caused by affection of such inertia and the like is prevented mechanically using a leaf spring or the like arranged in a space which is made around upper part of rotating axis. However, there is a limit to perform prevention of the vibration generated in the display portion by such mechanical way.

SUMMARY OF THE INVENTION

It is an object of the present invention to provide a thin type display device in which the vibration that is generated in the rotation of the display portion utilizing the rotation driving mechanism is suppressed by controlling rotation of a motor.

To attain the above described object a thin type display device in accordance with the present invention includes: a display portion which is equipped with a screen to display image; a pedestal portion to support the display portion; a connecting portion to connect the pedestal portion and the display portion; a swivel mechanism which is set up in the connecting portion to rotate the display portion in horizontal direction; a motor which gives rotating force to the swivel mechanism; an infrared light receiving portion which receives an infrared signal output from a remote controller for instructing operations to instruct driving of the swivel mechanism; a signal converting portion which converts the infrared signal that is received in the infrared light receiving portion into a control signal; a main control portion which confirms content of the instruction by analyzing the control signal from the signal converting portion; a motor driver to drive the motor by a signal output from the main control portion; and an operating voltage control portion to which a signal is input from the main control portion and generates a voltage switching signal to switch operating voltage of the motor that is supplied from the motor driver, and the device is characterized by that when the main control portion recognizes to start driving of the swivel mechanism based on the infrared signal that is output from the remote controller and is received in the infrared light receiving portion, the operating voltage that is supplied from the motor driver is switched and raised in stepwise by the voltage switching signal from the operating voltage control portion and the operating voltage is made a maximum value after a prescribed time length is passed from the starting of driving.

Further, a thin type display device in accordance with the present invention includes: a display portion which is equipped with a screen to display image; a pedestal portion to support the display portion; a connecting portion to connect the pedestal portion and the display portion; a swivel mechanism which is set up in the connecting portion to rotate the display portion in horizontal direction; a motor which gives rotating force to the swivel mechanism; a motor driver to drive the motor; and an operating voltage control portion which generates a voltage switching signal to switch operating voltage of the motor that is supplied from the motor driver, and the device is characterized by that when driving of the swivel mechanism is started, the operating voltage that is supplied from the motor driver is switched and raised in stepwise by the voltage switching signal from the operating voltage control portion and the operating voltage is made a maximum value after a prescribed time length is passed from the starting of driving. In the thin type display device which is structured as above described, it is preferable that the operating voltage from the motor driver is switched by that the operating voltage control portion switches value of bias voltage which is supplied to the motor driver. Further it is preferable that the motor driver is equipped with a control terminal to switch the operating voltage of the motor, and the operating voltage from the motor driver is switched by that value of a signal that is output from the operating voltage control portion to the control terminal of the motor driver is switched.

In addition it is also preferable that the operating voltage control portion is composed of a digital-analog conversion circuit and a digital signal to instruct the operating voltage is converted into an analog signal by the operating voltage control portion to be supplied to the motor driver.

According to the present invention the operating voltage output to the motor can be switched and raised in stepwise when the swivel mechanism is started to drive. As a result, acceleration of its rotating speed can be performed gradually by changing torque of the motor slowly. Further, when the display portion is stopped immediately after the swivel mechanism is started to drive, the stopping operation is performed while the torque of the motor is still low. As a result, reaction which is generated when the display portion is rotated by the swivel mechanism can be suppressed, and vibration of it can be minimized.

DESCRIPTION OF THE PREFERRED EMBODIMENTS

Figure 1:
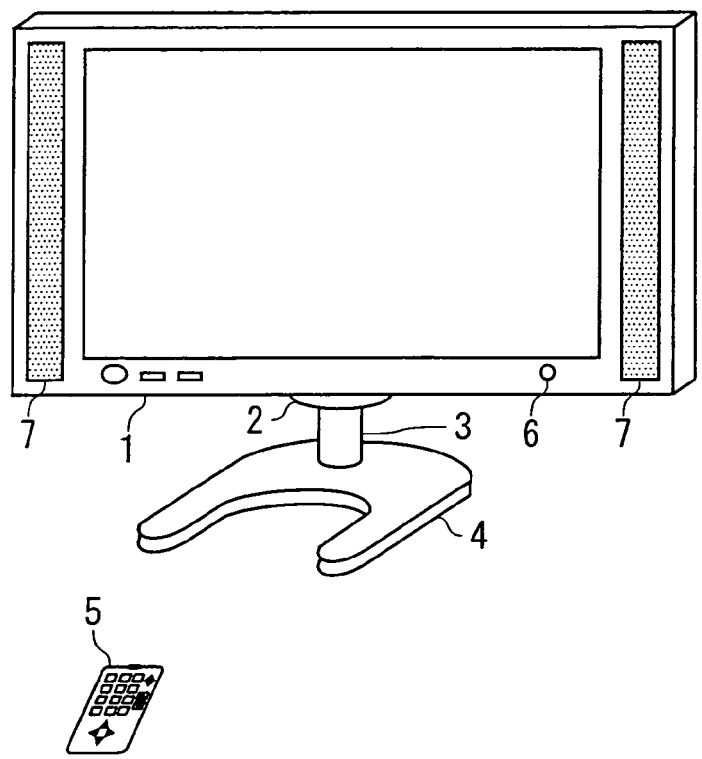
FIG. 1 is a schematic perspective view to show an appearance structure of a thin type television device according to one embodiment of the present invention.
Figure 3:
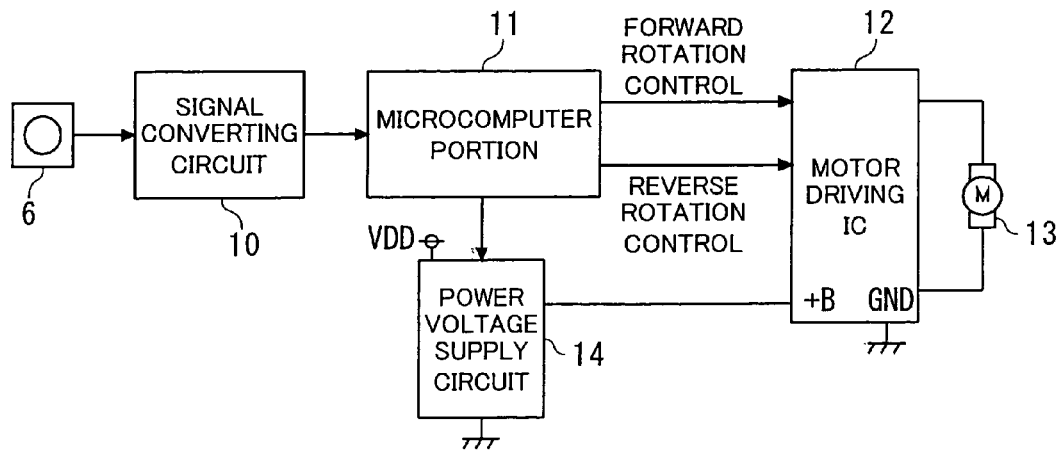
FIG. 3 is a block diagram to show a structure of a swivel mechanism for the thin type television device shown in FIG. 1.

Hereinafter embodiment of the present invention will be explained with reference to drawings by way of example of a thin type television device which is one of thin type display device. FIG. 1 is a schematic perspective view to show an appearance structure of a thin type television device according to the present embodiment. FIG. 3 is a block diagram to show a structure of a swivel mechanism for the thin type television device shown in FIG. 1.

The thin type television device according to the present embodiment is provided with a display portion 1 which is a screen to reproduce and output an image, a supporting portion 2 which is connected to a center of bottom side of a back surface which is opposite side of the screen of the display portion 1, a driving portion 3 which is connected with the supporting portion 2 and includes an axis to rotate in horizontal direction, and a pedestal 4 on which the driving portion 3 is set as shown in FIG. 1. That is, the driving portion 3 whose axis direction is perpendicular to the horizontal direction is set in order to locate at center portion on the pedestal 4, and the supporting portion 2 is formed on the driving portion 3 at a position that is opposite to the pedestal 4. Further, the thin type television device can be supported not to fall down on the pedestal 4 whose setting area is wide by connecting the supporting portion 2 to the back surface of the display portion 1.

Further, inside of the driving portion 3, though they are not shown in the drawing, an axis to rotate in the horizontal direction, a motor to rotate the axis, and a power transmission mechanism such as gears and the like to transmit a rotating force from the motor, are arranged and by these elements the swivel mechanism is composed of. That is, the display portion 1 can be rotated in the horizontal direction by an operation of the swivel mechanism that is set up in the driving portion 3. At this point, it is no problem that a tilting mechanism that makes the display portion 1 in a direction which is substantially perpendicular to the horizontal direction (tilting direction), is also provided in the driving portion 3.

In addition, the thin type television device which is structured as above described is provided with an infrared light receiving portion 6 to receive infrared signal from a remote controller 5 in observed side where the screen of the display portion 1 is arranged in order that it is controlled by the remote controller 5 which performs instructions of operations by transmitting the infrared signal. By operating the remote controller 5, a microcomputer which is set up in the thin type television device recognizes content of the instruction of operation that is included in the infrared signal which is output from the remote controller 5. Then, based on result of analysis of the infrared signal which is received by the infrared receiving portion 6, tuning operation by a tuner circuit (not shown) in the thin type television device, volume changing for a speaker 7, rotation operation by the driving portion 3 for the display portion 1, or the like is controlled.

Figure 2:
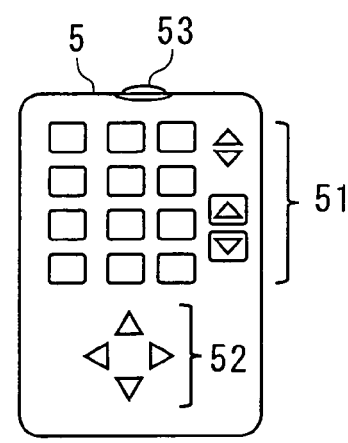
FIG. 2 is a schematic diagram to show a structure of a remote controller for the thin type television device shown in FIG. 1.

The remote controller 5 is equipped with channel buttons 51 to select channel to be received, driving instruction buttons 52 to drive the display portion1 in the horizontal direction or the tilting direction, and an infrared transmitting portion 53 to transmit the infrared signal that corresponds to the button which is pushed on as shown in FIG. 2. The driving portion 3 is operated such that the display portion 1 is driven in a direction which corresponds one of the driving instruction buttons 52 when it continues to be pushed on.

Hereinafter the swivel mechanism of the thin type television device which is structured as above described will be explained with reference to a block diagram of FIG. 3.

The swivel mechanism shown in FIG. 3 is equipped with a signal converting portion 10 which performs demodulation and signal conversion of a signal from the infrared light receiving portion 6 that receives the infrared signal from the remote controller 5, a microcomputer portion 11 which analyses control signals from the signal converting portion 10, a motor driving IC 12 which is controlled by the microcomputer portion 11, a motor 13 which is driven by the motor driving IC 12, and a power voltage supply circuit 14 which supplies power voltage to the motor driving IC 12.

A forward rotation control signal which makes the motor 13 forward rotation and a reverse rotation control signal which makes the motor 13 reverse rotation are output from the microcomputer portion 11 to the motor driving IC 12. The swivel mechanism of the driving portion 3 operates to rotate the display portion 1 in the horizontal direction because of operation of the motor 13 controlled by the motor driving IC 12 to which the forward rotation control signal and the reverse rotation control signal are input. Further, the motor driving IC 12 is equipped with an inverter circuit (not shown) which is connected to a motor coil of the motor 13, and the forward rotation and the reverse rotation of the motor 13 is set by input of the forward rotation control signal and the reverse rotation control signal to a control terminal of a transistor switch of which the inverter circuit (not shown) is composed.

The motor driving IC 12 also equipped with a ground terminal (reference mark GND in FIG. 3) which earths the inverter circuit (not shown) and voltage supply terminal (reference mark +B in FIG. 3) to which the power voltage is supplied. The inverter circuit (not shown) is biased by that the ground terminal is earthed and voltage which is output from the power voltage supply circuit 14 is supplied to the voltage supply terminal. Further, value of the output voltage from the power voltage supply circuit 14 is switched by a control signal from the microcomputer portion 11 and the output voltage is supplied to the voltage supply terminal of the motor driving IC 12. Torque of the motor 13 is varied by the value of the voltage which is supplied to the voltage supply terminal of the motor driving IC 12. That is, when the output voltage from the power voltage supply circuit 14 is higher, the torque of the motor 13 becomes larger.

Figure 4:
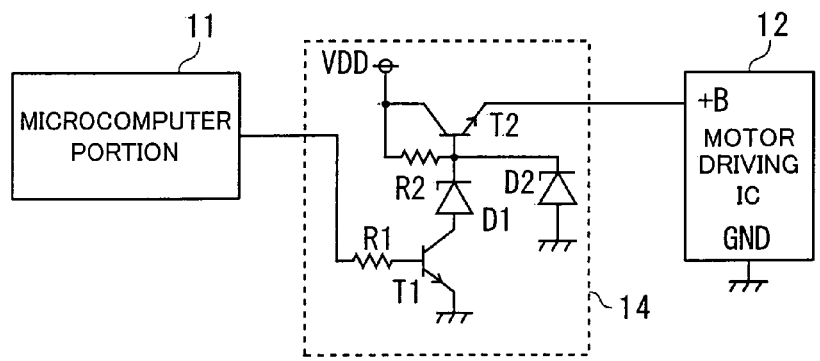
FIG. 4 is a block diagram to show a structure of a power voltage supply circuit for the swivel mechanism shown in FIG. 3.

An example of a structure of the power voltage supply circuit 14 will be explained with reference to a block diagram of FIG. 4. As shown in FIG. 4, the power voltage supply circuit 14 is equipped with an NPN transistor T1 whose base to which the control signal from the microcomputer portion 11 is input via a resistor R1 and whose emitter is earthed, a zener diode D1 whose anode is connected to a collector of the transistor T1, a zener diode D2 whose cathode is connected to a cathode of the zener diode D1 and whose anode is earthed, an NPN transistor T2 whose base is connected to cathodes of the zener diodes D1 and D2 and whose collector is supplied with voltage VDD, and a resistor R2 which is connected between the base and the collector of the transistor T2.

Further, the anode of the zener diode D2 is earthed and an emitter of the transistor T2 is connected to the voltage supply terminal of the motor driving IC 12. Still further, zener voltage of the zener diode D1 is set so as to be V½ (for example, 6V) when zener voltage of the zener diode D2 is V1 (for example, 12 V).

By arranging as above described, when the transistor T1 is OFF, the zener voltage V1 of the zener diode D2 is supplied to the voltage supply terminal of the motor driving IC 12 via the transistor T2 which works as a clamp. Inversely, when the transistor T1 is ON, the zener voltage V½ of the zener diode D1 is supplied to the voltage supply terminal of the motor driving IC 12 via the transistor T2 which works as the clamp. At this point, in this embodiment the zener voltage of the zener diode D1 is set in V½, however, it is no problem that the value is different from V½ as far as it is lower than the zener voltage V1 of the zener diode D2.

An operation by the swivel mechanism in which the power voltage supply circuit 14 that is structured as above described is equipped will be explained with reference to a timing chart shown in FIG. 5. When the remote controller 5 is operated, an infrared signal corresponding to the operation is received by the infrared light receiving portion 6. Then, the infrared signal received by the infrared light receiving portion 6 is converted into an electric signal and the signal is output to the signal converting portion 10. The signal converting portion 10 performs demodulation and signal conversion of the electric signal from the infrared light receiving portion 6, and the infrared signal from the remote controller 5 is analyzed by outputting the converted signal to the microcomputer portion 11.

Figure 5:
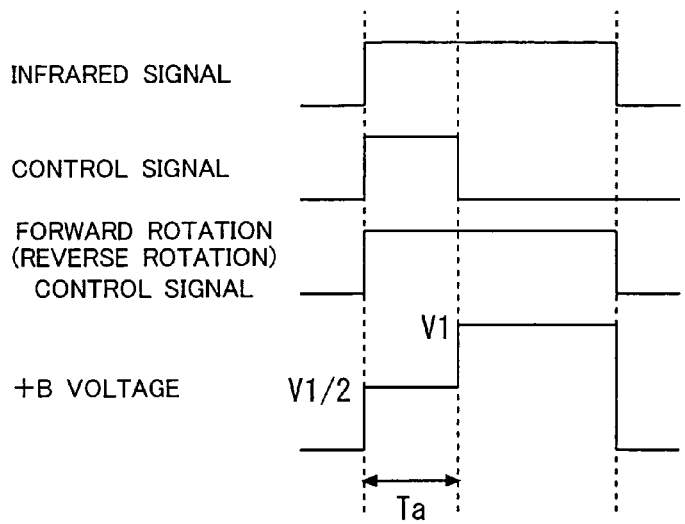
FIG. 5 is a timing chart to show a relation between transition of a control signal from the remote controller and transition of voltage value which is output from the power voltage supply circuit.

When the driving instruction buttons 52 of the remote controller 5 is pushed on and the infrared signal which instructs the forward rotation or the reverse rotation of the motor 13 is output from the infrared transmitting portion 53, the device recognizes the forward rotation or the reverse rotation of the motor 13 is instructed by analyzing the infrared signal from the remote controller 5 using the microcomputer portion 11 as shown in FIG. 5. Then, the forward rotation control signal or the reverse rotation control signal to drive the motor 13 is output from the microcomputer portion 11 to the motor driving IC 12. As above described, when the infrared signal from the remote controller 5 is output and the microcomputer portion 11 starts outputs of the forward rotation control signal or the reverse rotation control signal, at the same time the control signal which is supplied from the microcomputer portion 11 to the power voltage supply circuit 14 becomes high.

By this transition, because the transistor T1 becomes ON in the power voltage supply circuit 14 by input of the control signal to be high from the microcomputer portion 11, the zener voltage V½ of the zener diode D1 is input to the voltage supply terminal of the motor driving IC 12 by operation of the zener diode D1. By this input, the motor 13 performs the forward rotation or the reverse rotation with low torque and the display portion 1 is rotated in right or left in the horizontal direction.

After that when a prescribed length of time Ta is passed in a state where the infrared signal to instruct the forward rotation or the reverse rotation is still output from the remote controller 5, this prescribed length of time Ta is confirmed by a time measurement of the microcomputer portion 11. Then, the transistor T1 in the power voltage supply circuit 14 is made OFF, because the microcomputer portion 11 makes the control signal which is input to the power voltage supply circuit 14 low. By this transition, because the zener diode D1 becomes not in operation, the zener voltage V1 of the zener diode D2 is input to the voltage supply terminal of the motor driving IC 12 by action of the zener diode D2. By this input, the motor 13 performs the forward rotation or the reverse rotation with high torque and the display portion 1 is rotated in right or left in the horizontal direction.

When a user stops to push on the driving instruction button 52 of the remote controller 5, then output of the infrared signal to instruct the forward rotation or the reverse rotation from the infrared transmitting portion 53 is stopped, signal input from the signal converting portion 10 becomes not detected in the microcomputer portion 11 because there is no input of the infrared signal at the infrared light receiving portion 6. Then, stop of the rotation of the motor 13 is confirmed by the microcomputer portion 11. By this confirmation, operation of the motor driving IC 12 is stopped because output of the forward rotation control signal or the reverse rotation control signal is ended. As a result, rotation of the motor 13 is stopped and the rotation operation of the display portion 1 is stopped because the rotation control of the motor 13 by the motor driving IC 12 is ended.

As above described, according to the present embodiment, when the rotation operation of the display portion 1 is started, because the bias voltage which is input to the motor driving IC 12 is raised in stepwise, operating voltage of the motor 13 by the motor driving IC 12 becomes higher in stepwise, as a result, it becomes possible to raise the torque of the motor 13 in stepwise. By these steps, not only reaction which is generated when the rotation of the display portion 1 is started can be suppressed, but also if the display portion 1 is stopped immediately after the rotation is started, the vibration caused by stopping can be suppressed because the torque of the motor 13 is weak.

Figure 6:
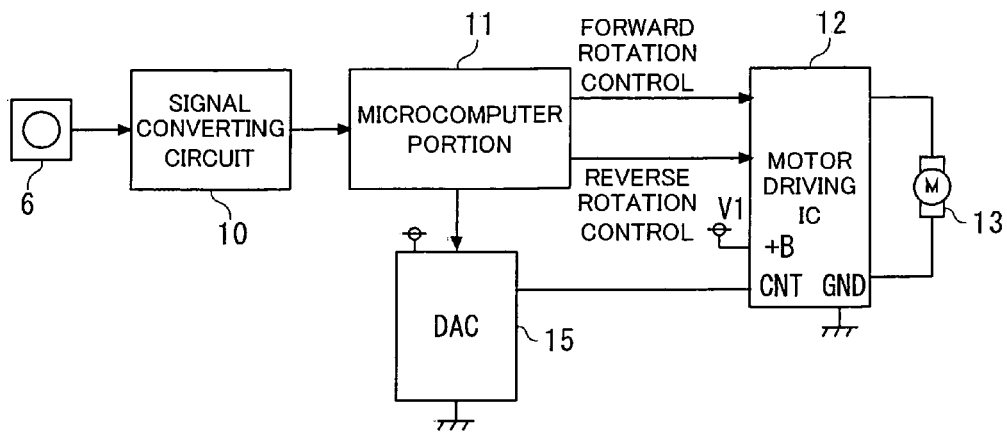
FIG. 6 is a block diagram to show another structure of the swivel mechanism for the thin type television device shown in FIG. 1.

At this point, in the present embodiment, the operating voltage and the torque of the motor 13 are varied in stepwise by changing voltage value which is supplied to the voltage supply terminal of the motor driving IC 12. However, it is no problem that as shown in FIG. 6, in case where the motor driving IC 12 is equipped with a control terminal (reference mark CNT in FIG. 6) to switch the operating voltage which changes the torque of the motor 13 from the motor driving IC12, value of control signal to this control terminal is switched to output by the microcomputer portion 11.

In this case because the signal which is input to the control terminal of the motor driving IC 12 is analog signal of voltage value or current value, a digital-analog conversion circuit (DAC circuit) 15 which converts the digital signal that is output from the microcomputer portion1 into the analog signal, is set up. It is no problem that this DAC circuit 15 is a DAC circuit that converts the digital signal which is parallel signal from the microcomputer portion 11 into the analog signal or the DAC circuit that converts the digital signal which is serial signal from the microcomputer portion 11 into the analog signal.

Further in the present embodiment, the voltage value which is input to the voltage supply terminal of the motor driving IC 12 is switched using two voltage values by controlling actions of the two zener diodes D1, D2 in the power voltage supply circuit 14. However, it is no problem that more than three different voltage values are switched and supplied to the voltage supply terminal of the motor driving IC 12. Still further, it is no problem that values of the control signal which are input to the control terminal of the motor driving IC 12 are switched in a plurality of steps as a structure shown in FIG. 6, as far as magnitude of the torque of the motor 13 are switched in a plurality of steps by changing the operating voltage of the motor driving IC 12 in a plurality of steps.

Figure 7:
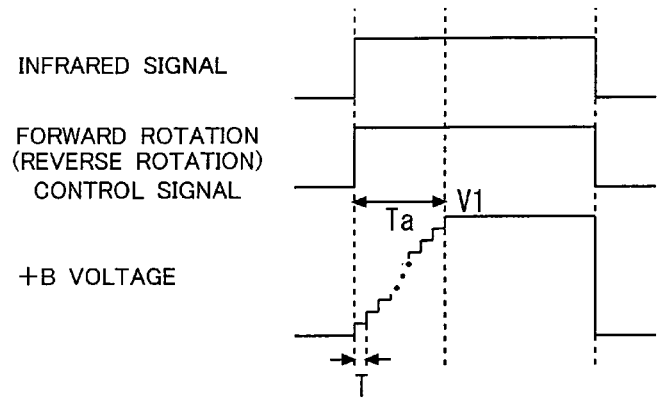
FIG. 7 is a timing chart to show another relation between transition of a control signal from the remote controller and transition of voltage value which is output from the power voltage supply circuit shown in FIG. 4.

In a structure in that the operating voltage of the motor driving IC 12 are switched in a plurality of steps as described above, it is preferable that the operating voltage of the motor 13 are raised higher in sequential for every prescribed time length T by the motor driving IC 12 when the infrared signal from the remote controller 5 is received as shown in FIG. 7. Then, operation of the motor driving IC 12 is stopped to terminate driving of the motor 13 when the infrared signal from the remote controller 5 becomes not input.

Figure 8:
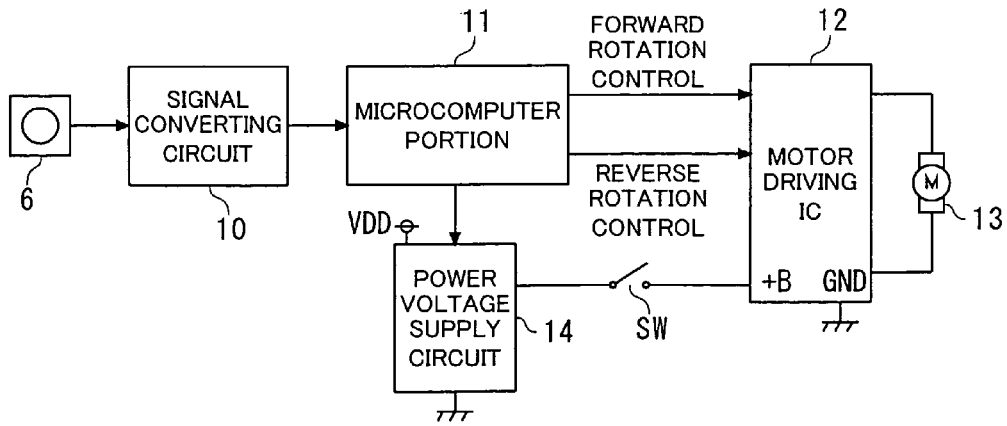
FIG. 8 is a block diagram to show another structure of the swivel mechanism for the thin type television device shown in FIG. 1.

Further, it is no problem that a switch SW is connected to the voltage supply terminal of the motor driving IC 12 as shown in FIG. 8, and when the microcomputer portion 11 confirms input of the infrared signal from the remote controller 5, the switch SW is turned ON by the microcomputer portion 11, and inversely, when the microcomputer portion 11 does not confirm input of the infrared signal from the remote controller 5, the switch SW is turned OFF by the microcomputer portion 11. By this arrangement, because the voltage supply to the motor driving IC 12 is terminated, motor driving IC 12 can be surely stopped.

Further in the above described embodiment, as for a structure in that voltage value that is supplied to the voltage supply terminal of the motor driving IC 12 is switched, structures shown in FIG. 3, FIG. 4, and FIG. 8 are explained as examples, and as for a structure in that value of the signal that is supplied to the control terminal of the motor driving IC 12 is switched, a structure shown in FIG. 6 is explained as example. However, it is no problem that other structure is employed as far as it controls such that the operating voltage of the motor driving IC 12 for the motor 13 is switched in stepwise in starting or stopping of the rotation of the motor 13, as shown in FIG. 5 or FIG. 7.

Still further, in the above described embodiment, as for the driving instruction buttons 52 of the remote controller 5, the infrared signal to instruct driving of the driving portion 3 is continued to output while the button is pushed on. However, it is no problem that a structure is employed where output of the infrared signal is started at a first push down, and output of the infrared signal is terminated at a second push down. In addition, it is no problem that a structure is employed where an infrared signal to instruct starting of driving of the driving portion 3 and an infrared signal to instruct stopping of driving of the driving portion 3 are output when driving and stopping of the driving portion 3 are instructed by operation of the driving instruction button 52.

The present invention can be applied not only to the thin type television device that is explained in the embodiments but also to the thin type display device which includes display devices to reproduce image of computer or the like. Further, the present invention can be applied to the thin type display device which utilizes various methods such as a liquid crystal method, a plasma method, a rear projection method, a thin type Braun tube method, an Organic Electro-Luminescence method, a Surface-conduction Electron-emitter method, or the like as the thin type display device. Further in the above described embodiment, a structure is employed in which the device is driven by the remote controller 5. However, it is no problem that an operating portion is set up in the main body of the thin type display device, and selecting channel operation or display portion 1 driving operation by the driving portion 3 is instructed using operation of the operating portion.

What is claimed is:

1. A thin type display device comprising:
   a display portion which is equipped with a screen to display image;
   a pedestal portion to support the display portion;
   a connecting portion to connect the pedestal portion and the display portion;
   a swivel mechanism which is set up in the connecting portion to rotate the display portion in horizontal direction;
   a motor which gives rotating force to the swivel mechanism;
   an infrared light receiving portion which receives an infrared signal output from a remote controller for instructing operations to instruct driving of the swivel mechanism;
   a signal converting portion which converts the infrared signal that is received in the infrared light receiving portion into a control signal;
   a main control portion which confirms content of the instruction by analyzing the control signal from the signal converting portion;
   a motor driver to drive the motor by a signal output from the main control portion; and an operating voltage control portion to which a signal is input from the main control portion and generates a voltage switching signal to switch operating voltage of the motor that is supplied from the motor driver, wherein the motor generates a torque corresponding to the operating voltage, and when the main control portion recognizes to start driving of the swivel mechanism based on the infrared signal that is output from the remote controller and is received in the infrared light receiving portion, the operating voltage control portion increases the torque stepwise by generating the voltage switching signal such that the operating voltage is switched and raised stepwise and the operating voltage is made a maximum value after a prescribed time length is passed from the starting of driving.

2. A thin type display device comprising:

a display portion which is equipped with a screen to display image;

a pedestal portion to support the display portion;

a connecting portion to connect the pedestal portion and the display portion;

a swivel mechanism which is set up in the connecting portion to rotate the display portion in horizontal direction;

a motor which gives rotating force to the swivel mechanism;

a motor driver to drive the motor; and an operating voltage control portion which generates a voltage switching signal to switch operating voltage of the motor that is supplied from the motor driver, wherein the motor generates a torque corresponding to the operating voltage, and when driving of the swivel mechanism is started, the operating voltage control portion increases the torque stepwise by generating the voltage switching signal such that the operating voltage is switched and raised stepwise and the operating voltage is made a maximum value after a prescribed time length is passed from the starting of driving.

3. The thin type display device according to claim 2, wherein the operating voltage from the motor driver is switched by that the operating voltage control portion switches value of bias voltage which is supplied to the motor driver.

4. The thin type display device according to claim 3, wherein the operating voltage control portion is composed of a digital-analog conversion circuit and a digital signal to instruct the operating voltage is converted into an analog signal by the operating voltage control portion to be supplied to the motor driver.

5. The thin type display device according to claim 2, wherein the motor driver is equipped with a control terminal to switch the operating voltage of the motor, and the operating voltage from the motor driver is switched by that value of a signal that is output from the operating voltage control portion to the control terminal of the motor driver is switched.

6. The thin type display device according to claim 5, wherein the operating voltage control portion is composed of a digital-analog conversion circuit and a digital signal to instruct the operating voltage is converted into an analog signal by the operating voltage control portion to be supplied to the motor driver.

* * * * *